(12) United States Patent
Konishi

(10) Patent No.: US 6,544,653 B2
(45) Date of Patent: *Apr. 8, 2003

(54) ADHESIVE FOR BINDING VINYL CHLORIDE TO STEEL PLATES AND VINYL CHLORIDE-COATED STEEL PLATES

(75) Inventor: Misao Konishi, Kanuma (JP)

(73) Assignee: Sony Chemicals Corp., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,898

(22) PCT Filed: Mar. 3, 1999

(86) PCT No.: PCT/JP99/01005

§ 371 (c)(1),
(2), (4) Date: Dec. 22, 1999

(87) PCT Pub. No.: WO99/51700

PCT Pub. Date: Oct. 14, 1999

(65) Prior Publication Data

US 2002/0035205 A1 Mar. 21, 2002

(30) Foreign Application Priority Data

Apr. 3, 1998 (JP) .............................. 10-90488

(51) Int. Cl.$^7$ .......................... B32B 15/08; B32B 27/08
(52) U.S. Cl. ................. 428/416; 428/424.6; 428/425.8; 525/109; 525/111; 525/131; 525/454; 525/455; 524/507; 524/537

(58) Field of Search ................. 525/109, 111, 525/131, 454, 455; 524/507, 537; 428/424.6, 416

(56) References Cited

U.S. PATENT DOCUMENTS

| | | | | |
|---|---|---|---|---|
| 4,197,219 A | * | 4/1980 | Damico | 428/460 |
| 5,231,130 A | * | 7/1993 | Wallon | 524/500 |
| 5,334,690 A | | 8/1994 | Schafheutle et al. | |
| 5,541,251 A | * | 7/1996 | Bontinck | 524/507 |
| 5,726,292 A | * | 3/1998 | Kusuoka | 524/839 |
| 5,907,012 A | * | 5/1999 | Voss | 524/591 |

FOREIGN PATENT DOCUMENTS

| | | | |
|---|---|---|---|
| JP | A-58-179274 | | 10/1983 |
| JP | B2-59-37034 | | 9/1984 |
| JP | A-1-130764 | | 5/1989 |
| JP | 6-157698 | | 6/1994 |
| JP | 08032230 | * | 2/1996 |
| JP | 8-81671 | | 3/1996 |
| JP | 9-302220 | | 11/1997 |

* cited by examiner

Primary Examiner—Patricia A. Short
(74) Attorney, Agent, or Firm—Oliff & Berridge, PLC

(57) ABSTRACT

An adhesive prepared by blending a hardening resin serving as the main component with an urethane resin having a polycarbonate structure. The addition of the urethane resin with the polycarbonate structure makes it possible to give an adhesive which has a high solvent resistance and a good low temperature impact resistance and achieves good adhesion between vinyl chloride and a steel plate. This urethane resin can be obtained by reacting a polyol with an isocyanate compound. It is advantageous to use the urethane resin in an amount of 5 to 35% by weight.

12 Claims, 4 Drawing Sheets

ADHESIVE FOR BINDING VINYL CHLORIDE TO STEEL PLATES AND VINYL CHLORIDE-COATED STEEL PLATES

TECHNICAL FIELD

This invention relates to an adhesive suitable for vinyl chloride-coated steel plates.

BACKGROUND ART

Owing to the high processability and good design properties, vinyl chloride-coated steel plates have been widely employed in the fields of household appliances and building materials.

In general, vinyl chloride-coated steel plates are produced by applying a vinyl chloride coating on the surface of a steel plate and then hardening the coating to give a resin film, or by adhering a vinyl chloride film to a steel plate. In these processes, an adhesive is used to adhere the vinyl chloride film or the resin film to the steel plate.

Since adhesives to be used in vinyl chloride-coated steel plates should be excellent in adhesiveness and heat resistance, a number of studies have been made on adhesives usable for these purposes.

For example, JPB S59-37034 discloses an adhesive for vinyl chloride-coated steel plates, which comprises an acrylic resin and an epoxy resin. On the other hand, JPA S58-179274 discloses an adhesive for vinyl chloride-coated steel plates, which comprises an acrylic resin, an epoxy resin and a phenoxy resin. In these cases, the adhesives are applied on steel plates and then hardened with the use of hardeners, thus elevating the adhesive force between the steel plates and vinyl chloride.

Moreover, JPA S58-179274 discloses an adhesive containing a flexibility-imparting agent (nitrile rubber, etc.) to improve the impact resistance at low temperatures.

However, the above-described adhesives suffer from a problem that the vinyl chloride coating films tend to peel off due to the insufficient solvent resistance thereof. To improve the solvent resistance of an adhesive, it has been a practice to elevate the extent of hardening of the adhesive. In the case of the above-described adhesives, however, there arises a problem that the flexibility is lowered with an increase in the extent of hardening, thereby causing the deterioration in the processability and low temperature impact resistance.

Moreover, there is an additional problem that combustible organic compounds are vaporized in the drying step and thus cause environmental pollution or exert undesirable effects on the human body.

In the prior art, therefore, studies have been made to develop adhesives exerting no undesirable effect on the environment, as shown in JPA H1-130764, etc. For example, there has been developed an adhesive for vinyl chloride-coated steel plates wherein a water-dispersible resin is used. However, this water-dispersible resin is an acrylic resin which has a poor solvent resistance, in addition to the defect of peeling off frequently.

An object of the present invention, which has been conceived to solve the above-described problems encountering in the prior art, is to provide an adhesive which is excellent in solvent resistance and low temperature impact resistance and can achieve good adhesion between vinyl chloride and steel plates.

Another object of the present invention is to provide an organic solvent-free adhesive for vinyl chloride-coated steel plates.

DISCLOSURE OF THE INVENTION

The present inventors considered that the poor flexibility of the conventional adhesives for vinyl chloride-coated steel plates might be caused by the fact that these adhesives contained, as the main components, acrylic resins/epoxy resins, acrylic resins/epoxy resins/phenoxy resins, etc.

Thus, the present inventors paid their attention to polyurethane resins having high flexibility and conducted intensive studies thereon. As a result, they have found that the addition of a urethane resin having a polycarbonate structure, among polyurethane resins, to a hardening resin makes the whole adhesive flexible and imparts a good solvent resistance thereto.

When the flexibility is imparted to an adhesive, the solvent resistance of the adhesive is generally deteriorated. On the contrary, the flexibility of an adhesive is lowered in association with improvement in the solvent resistance thereof. However, the present inventors have found out that both of these contradictory requirements can be satisfied each at a practically acceptable level by regulating the content of the urethane resin in such an adhesive to a specific range.

The present inventors further paid their attention to the fact that when the hardening resin and the polyurethane resin, i.e., the main components of the adhesive as described above, were each in the form of an aqueous dispersion, no organic solvent was necessary.

The present invention has been completed based on these findings. Namely, the invention as set forth in claim 1 relates to an adhesive comprising as the main component a hardening resin which is characterized by containing an urethane resin having a polycarbonate structure.

As an example of this adhesive, citation can be made of one wherein said urethane resin is a product obtained by reacting a polyol with an isocyanate compound and said polyol has a polycarbonate structure, as in the invention as set forth in claim 2.

The content of said urethane resin in the adhesive may range from 5% by weight to 35% by weight, as in the invention as set forth in claim 3.

Moreover, it is preferable that said hardening resin and said urethane resin are each in the form of an aqueous dispersion, as in the invention as set forth in claim 4.

BEST MODE FOR CARRYING OUT THE INVENTION

Figure 1:
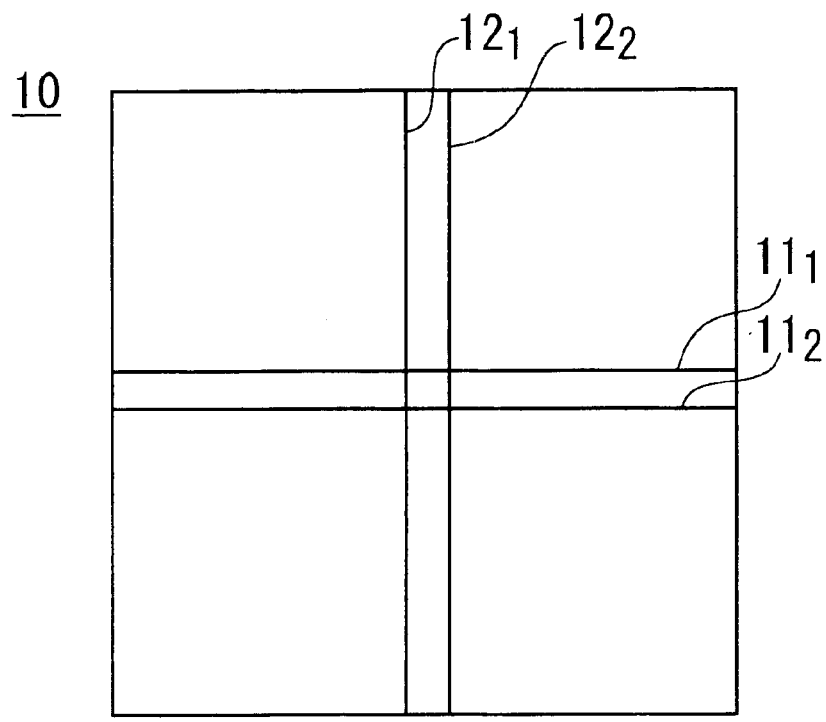
FIG. 1 shows a test piece for evaluating the properties of the adhesive according to the present invention.

The adhesive of the present invention, which is suitable for vinyl chloride-coated steel plates, comprises a hardening resin as the main component and further contains a specific urethane resin.

In the present invention, the hardening resin is used to impart to the adhesive heat resistance and adhesiveness to metal (steel) plates. For example, therefor acrylic resins having functional groups such as carboxyl, hydroxyl, glycidyl, and amino groups and epoxy resins such as bisphenol-type epoxy resins typified by bisphenol A and bisphenol F, novolak-type epoxy resins, glycidyl ether-type epoxy resins, etc. can be used.

It is also possible to further add a phenolic resin thereto to improve the adhesiveness to metal (steel) plates, though such a phenolic resin plays the same role as the above-described epoxy resin.

On the other hand, examples of the hardener for hardening the above-described hardening resin include dicyandiamide-imidazole, etc.

The hardening resin is employed in an amount of from 65 to 95% by weight in the adhesive. When the hardening resin comprises an acrylic resin, an epoxy resin, a phenolic resin and a hardener, the contents of these components preferably range from 20 to 82% by weight, from 5 to 25% by weight, from 5 to 20% by weight and from 3 to 10% by weight respectively.

The urethane resin to be used in the present invention is that having a polycarbonate structure. Examples thereof include urethane resins formed by reacting polyols having a polycarbonate structure with isocyanate compounds.

Reactions for synthesizing urethane resins having a polycarbonate structure from polyols and isocyanate compounds are publicly known and disclosed in, for example, JPA S61-192775, JPB S58-4051, JPA H2-14272, and JPA H8-12033.

Now, an example of the synthesis reactions disclosed in these references will be illustrated. First, diethyl carbonate is mixed with 1,6-hexanediol and reacted at 120 to 200° C. for 15 hours. Next, the reaction mixture is cooled to 150° C. and ethanol is eliminated there from under reduced pressure, from 30 to 50 mmHg, to give polycarbonate polyol.

To the polycarbonate polyol, 1,6-hexanediol and 1,10-decanedicarboxylic acid are added and reacted at 200 to 220° C. for 8 hours. Next, the reaction is carried out under reduced pressure, from 30 to 50 mmHg, to give polycarbonate ester polyol.

The obtained polycarbonate ester polyol is mixed uniformly with 1,4-butanediol, trimethylolpropane, methyl isobutyl ketone, and toluene. To the resultant mixture, isophorone diisocyanate is added and the mixture is reacted at 100 to 115° C. for 5 hours. Thus, an urethane resin having the polycarbonate structure is obtained.

As described above, the urethane resin usable in the present invention can be obtained by the publicly known synthesis reactions.

The adhesive according to the present invention can also contain a polyol having no polycarbonate structure, for example, polylactone polyol, polyether polyol, polyester polyol, etc.

On the other hand, the isocyanate compound may be a publicly known one. For example, therefor diisocyanates such as tolylene diisocyanate, diphenylmethane diisocyanate, naphthalene diisocyanate, isophorone diisocyanate, etc., adducts thereof, or polyisocyanates can be used.

It is preferable in the present invention that the adhesive contains from 5 to 35% by weight of the above-described urethane resin.

When the content of the urethane resin in the adhesive is less than 5% by weight, only insufficient effects of the present invention can be established. When the content of the urethane resin exceeds 35% by weight, on the other hand, there arises a tendency toward the deterioration in the solvent resistance and adhesiveness in the case of the combined use with some hardening resins.

The adhesive according to the present invention can be produced by dissolving the above-described hardening resin in an organic solvent to give a solution, separately dissolving/dispersing the urethane resin of the present invention in an organic solvent to give another solution, and then mixing these solutions together.

When no organic solvent is used, an aqueous dispersion of the hardening resin and an aqueous dispersion of the urethane resin of the present invention are prepared separately and then mixed together. Thus, the adhesive of the present invention can be obtained.

To further illustrate the present invention in greater detail, the following examples will be given.

EXAMPLE 1

Production of Adhesive 33 parts by weight of methyl methacrylate, 5 parts by weight of butyl acrylate, 1 part by weight of acrylic acid, and 1 part by weight of glycidyl methacrylate were prepared and subjected to emulsion polymerization in 60 parts by weight of ion-exchanged water containing an emulsifier (neoco 1210, manufactured by Nippon Nyukazai) to give an aqueous acrylic dispersion.

To 45parts by weight (solid content: 40%) of this aqueous acrylic dispersion were added 5 parts by weight (solid content: 71%) of an aqueous phenol dispersion (BRL1100EE, manufactured by Showa Highpolymer Co., Ltd.), 10 parts by weight (solid content: 40%) of an aqueous epoxy dispersion (ASAHI CIBA ECN1400, manufactured by Asahi Denka Kogyo K.K.), 5 parts by weight (solid content: 30%) of an aqueous dispersion of a polyurethane resin (ADEKA HUX 386, manufactured by Asahi Denka Kogyo K.K.) which was a product obtained by reacting a polyol with an isocyanate compound and had a polycarbonate structure, and 2 parts by weight of a hardener (dicyandiamide: DICY). Then the resultant mixture was thoroughly stirred to give the desired adhesive.

Formation Vinyl Chloride-coated Steel Plate

The above-described adhesive was applied onto the surface of a zinc-coated steel plate of 0.5 mm in thickness and the moisture was vaporized to form an adhesive layer. This adhesive layer had a thickness of 6 $\mu$m.

Subsequently, this adhesive layer was baked at 220° C. Then a vinyl chloride film of 150 $\mu$m in thickness was further laminated thereon to give the desired vinyl chloride-coated steel plate.

Evaluation (1) Adhesiveness

The vinyl chloride-coated steel plate formed above was cut into a definite size (5 cm×5 cm) to give a test piece 10. Then, the vinyl chloride film on the surface of the test piece 10 was cut in a double cross with a knife. In FIG. 1, two nicks 11$_1$ and 11$_2$ with an interval of 5 mm were given crosswise, while two nicks 12$_1$ and 12$_2$ with an interval of 5 mm were given lengthwise.

Figure 2:
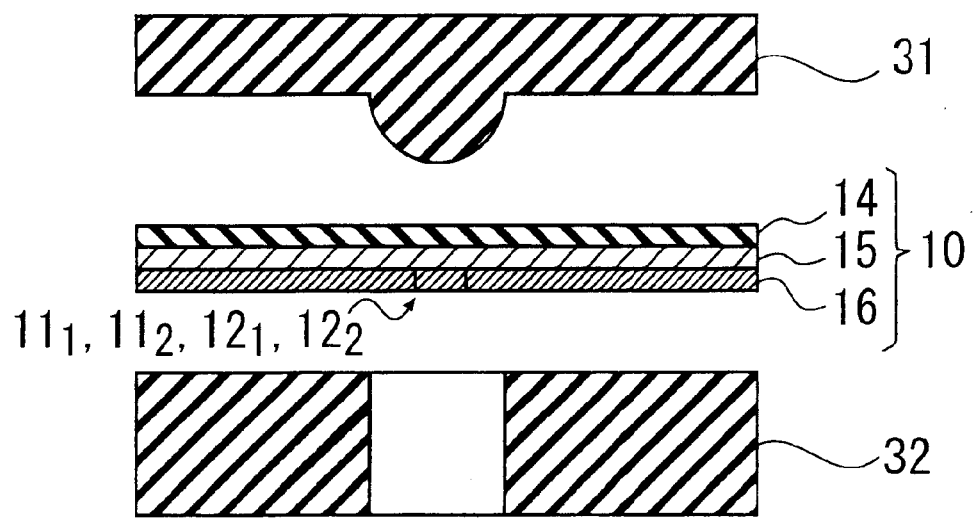
FIG. 2 is a diagram for illustrating the processed state of the test piece in FIG. 1.
Figure 3:
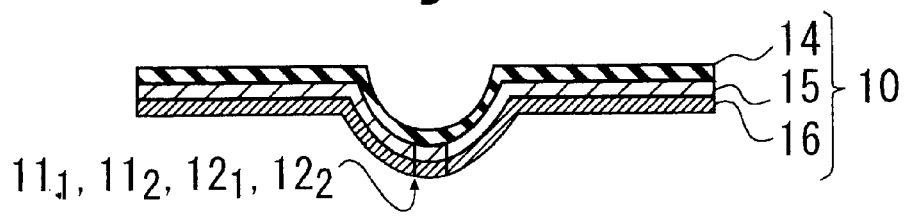
FIG. 3 shows an extrusion processed test piece.
Figure 4:
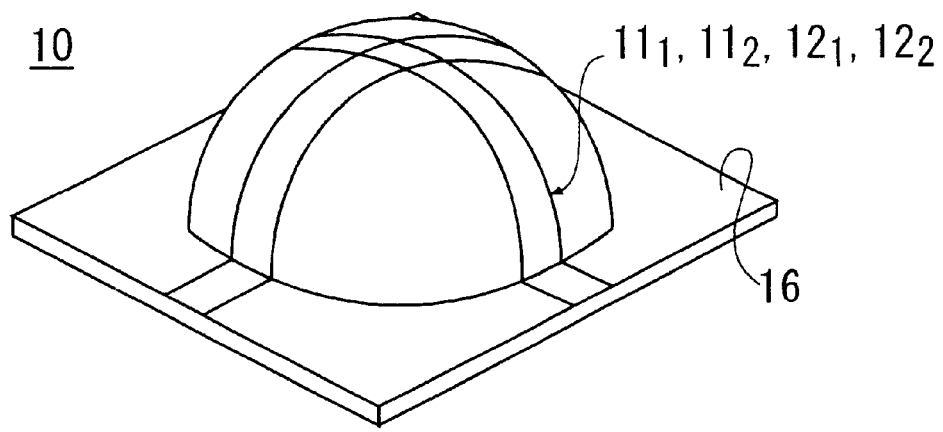
FIG. 4 is a perspective view of the test piece in FIG. 3.

As FIG. 2 shows, this test piece consisted of a steel plate 14, an adhesive layer 15 and a vinyl chloride film (vinyl chloride layer) 16. A convex fixture 31 was provided in the steel plate 14 side and the vinyl chloride 16 side was located toward a concave fixture 32. Thus, the vinyl chloride-coated steel plate was sandwiched between the convex fixture 31 and the concave fixture 32 and subjected to extrusion processing. As a result, a protrusion was made in the vinyl chloride film 16 side of the vinyl chloride-coated steel plate, as shown in FIGS. 3 and 4.

(2) Evaluation Criteria

After the completion of the extrusion processing, the test piece 10 was observed with the naked eye and the peel-off state of the vinyl chloride film 16 from the steel plate 14 was evaluated on the basis of the observation criteria 41 to 45 given in FIG. 6 as follows (the judgement was made in accordance with Erichsen test of 8 mm diaphragm).

| | |
|---|---|
| 41: no abnormality (no lifting). | Evaluated as A. |
| 42: slight lifting at the center of the protrusion. | Evaluated as B. |
| 43: lifting at the center of the protrusion. | Evaluated as C. |
| 44: lifting from the center to the intermediate part of the protrusion. | Evaluated as D. |
| 45: lifting to the bottom of the protrusion. | Evaluated as E. |

Figure 6:
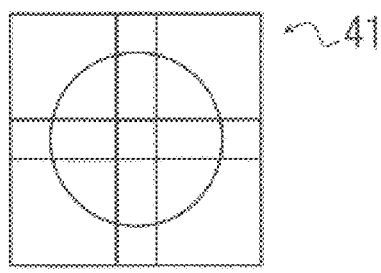
FIG. 6 shows criteria for evaluating the low temperature impact resistance.
Figure 6:
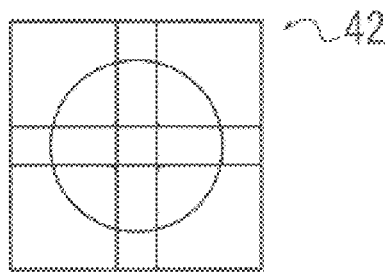
Figure 6:
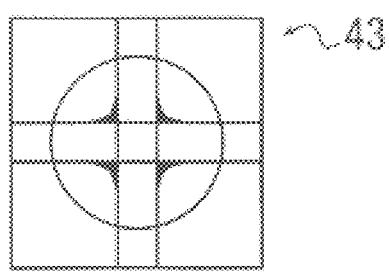
Figure 6:
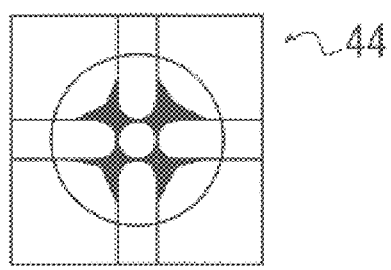
Figure 6:
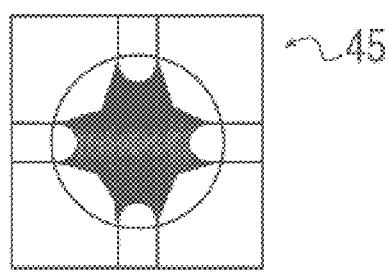

Solid parts in 41–45 given in FIG. 6 correspond to the parts where the vinyl chloride film 16 was lifted up and thus the steel plate 14 or the adhesive layer 15 was exposed.

Next, the part surrounded by the nicks 11₁, 11₂, 12₁, and 12₂ on the surface of the vinyl chloride film 16 of the extrusion-processed test piece 10 was peeled off with tweezers (hereinafter referred to as "forced peeling") and the state was evaluated on the basis of the observation criteria 51–55 given in FIG. 7 as follows.

| | |
|---|---|
| 51: no abnormality (no lifting). | Evaluated as ⑤. |
| 52: slight peeling at the center of the protrusion. | Evaluated as ④. |
| 53: peeling from the center to the intermediate part of the protrusion. | Evaluated as ③. |
| 54: peeling almost to the bottom edge of the protrusion. | Evaluated as ②. |
| 55: peeling to the bottom edge of the protrusion. | Evaluated as ①. |

Figure 7:
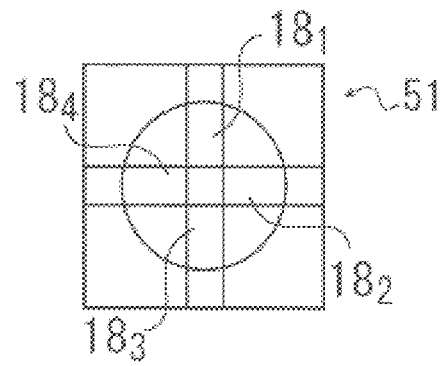
FIG. 7 shows criteria for evaluating the adhesiveness.
Figure 7:
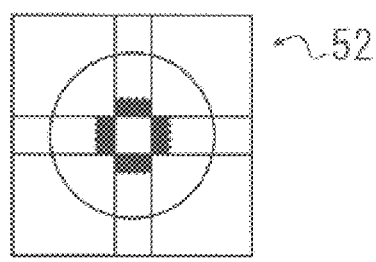
Figure 7:
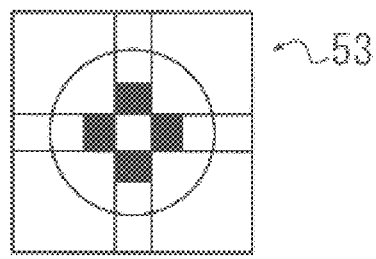
Figure 7:
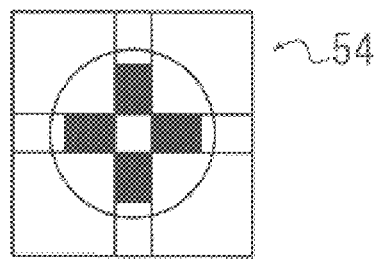
Figure 7:
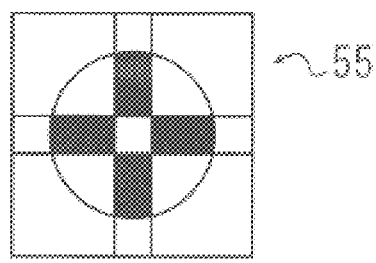

The forcedly peeled parts are shown by 181–184 in FIG. 7. Solid parts in the evaluation criteria 51 to 55 correspond to the parts where the vinyl chloride film 16 was peeled off and thus the steel plate 14 or the adhesive layer 15 was exposed.

As the test piece 10, the one immediately after the completion of the extrusion processing and another one having been immersed in boiling water for 2 hours were used.

(3) Solvent Resistance Test

Figure 5:
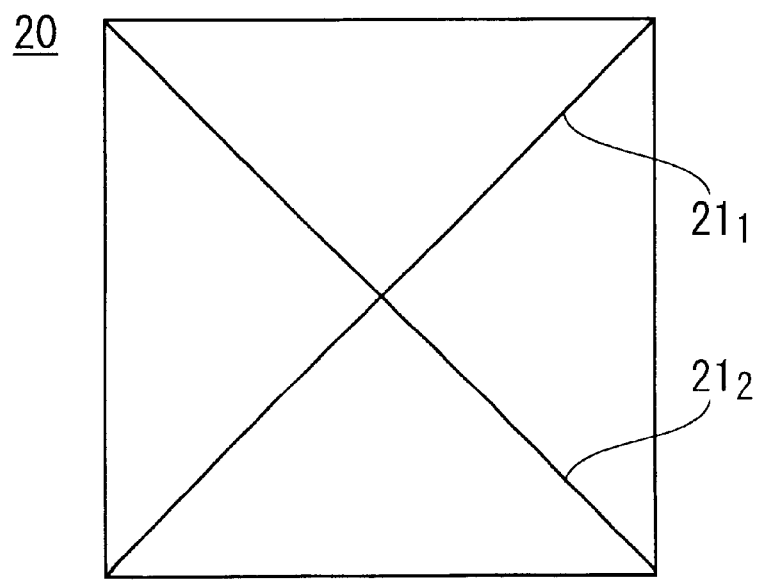
FIG. 5 shows a test piece used in evaluating the solvent resistance.

A test piece 20 different from the test piece 10 was prepared and two diagonal nicks 21₁, and 21₂ were formed on vinyl chloride film on its surface as shown in FIG. 5. Then it was immersed in MEK (methyl ethyl ketone) for 10 minutes to evaluate the solvent resistance.

(4) Low Impact Resistance Test

By using the convex/concave fixtures 31 and 32 as shown in FIG. 2, the test piece 10 was placed on the concave fixture 32 with the vinyl chloride film 16 downward. At a temperature of 5° C., the convex fixture 31 (weight: 7.5 kg) was dropped thereon from a height of 1 m and thus the low temperature impact resistance was evaluated on the basis of the criteria given in FIG. 6.

(5) Results

TABLE 1

Evaluation results

| | Urethane resin content (weight %) in adhesive | Solvent resistance | Low temperature impact resistance | Adhesiveness | | | |
|---|---|---|---|---|---|---|---|
| | | | | After extrusion | | After immersing in boiling water | |
| | | | | Film peel-off at extrusion | Film peel-off after forced peeling | Film peel-off at extrusion | Film peel-off after forced peeling |
| Ex. 1 | 5 | ○ | C | A | ① | A | ① |
| Ex. 2 | 10 | ○ | B | A | ③–⑤ | A | ②–③ |
| Ex. 3 | 15 | ○ | A | A | ③–⑤ | A | ①–③ |
| Ex. 4 | 25 | ○ | A | A | ③–⑤ | A | ①–② |
| Ex. 5 | 30 | ○ | A | A | ③–⑤ | A | ① |
| Ex. 6 | 35 | Δ | A | A | ②–④ | A | complete peeling |
| Comp. Ex. 1 | 0 | X | D | B | ①– complete peeling | C | complete peeling– ① |

Table 1 summarizes the results of the above evaluation tests.

The results of the solvent resistance test given in Table 1 are expressed as follows: i.e., ○ means one having a sufficient solvent resistance; Δ means one having a practically acceptable solvent resistance though showing some changes; and X means one being troublesome in practice in solvent resistance.

The vinyl chloride-coated steel plate wherein the adhesive of Example 1 was employed had a sufficient solvent resistance and a practically acceptable low temperature impact resistance.

Also, it suffered from no peeling off at the extrusion. In the forced peeling test, the vinyl chloride film remained on the sample, which indicated that the adhesiveness was elevated.

Comparative Example 1

A vinyl chloride-coated steel plate was formed by the same method as that of Example 1 but using no urethane resin. The test piece was evaluated as in Example 1. The results are also given in the above Table 1.

As Table 1 clearly shows, the vinyl chloride-coated steel plate of Comparative Example 1 showed a low solvent resistance and a poor adhesiveness.

EXAMPLES 2–5

Vinyl chloride-coated steel plates were formed by the same method as the one of Example 1 but varying the content of the urethane resin as shown in Table 1. Each test piece thus obtained was evaluated as in Example 1. The results are also given in the above Table 1.

As Table 1 clearly shows, each vinyl chloride coating thus formed had a high solvent resistance and a good low temperature impact resistance. With respect to the adhesiveness, no peeling occurred at the extrusion. In the forced peeling test, the vinyl chloride film remained on the sample, which indicated a high adhesiveness.

These data indicate that the content of the urethane resin preferably ranges from 5 to 35% by weight, especially preferably from 10 to 15% by weight.

In the cases as described above, a vinyl chloride film was employed as the vinyl chloride layer. Alternatively, a vinyl chloride coating may be applied directly on the adhesive layer and hardened, thus forming a vinyl chloride layer.
Industrial Applicability:

The adhesive according to the present invention can achieve both of a high solvent resistance and a good low temperature impact resistance, which makes it possible to form a long-wearing vinyl chloride-coated steel plate.

A vinyl chloride-coated steel plate with the use of the adhesive according to the present invention suffers from no peeling-off of the vinyl chloride film immediately after the extrusion processing or after exposed to boiling water, thus establishing a good processability.

Moreover, the adhesive of the present invention can achieve good adhesion between the steel plate and the vinyl chloride film so that the vinyl chloride film is broken upon forced peeling.

What is claimed is:

1. A vinyl chloride-coated steel plate comprising:
   a steel plate,
   a vinyl chloride sheet, and
   an adhesive for binding said vinyl chloride sheet to steel plates, wherein said adhesive comprising a hardening resin as the main component, and characterized by containing an urethane resin having a polycarbonate structure wherein the adhesive contains the hardening resin from 65–95% by weight and said hardening resin contains from 20 to 82% by weight of an acrylic resin, from 5 to 25% by weight of an epoxy resin, from 5 to 20% by weight of a phenolic resin and from 3 to 10% by weight of a hardener.

2. A vinyl chloride-coated steel plate according to claim 1, wherein said urethane resin is a product obtained by reacting a polyol with an isocyanate compound and said polyol has a polycarbonate structure.

3. The vinyl chloride-coated steel plate according to claim 2, said adhesive contains from 5 to 35% by weight of said urethane resin.

4. The vinyl chloride-coated steel plate according to claim 3, wherein said hardening resin and said urethane resin are each in the form of an aqueous dispersion.

5. The vinyl chloride-coated steel plate according to claim 4, wherein said hardening resin containing at least one resin selected from the group consisting of an acrylic resin having a functional group and an epoxy resin.

6. The vinyl chloride-coated steel plate according to claim 5, wherein said hardening resin containing at least one resin selected from the group consisting of bisphenol-based epoxy resin, novolak-based epoxy resin and glycidyl ether-based epoxy resin.

7. The vinyl chloride-coated steel plate according to claim 2, wherein said hardening resin and said urethane resin are each in the form of an aqueous dispersion.

8. The vinyl chloride-coated steel plate according to claim 2, said adhesive contains from 10 to 30% by weight of said urethane resin.

9. The vinyl chloride-coated steel plate according to claim 1, said adhesive contains from 5 to 35% by weight of said urethane resin.

10. The vinyl chloride-coated steel plate according to claim 9, wherein said hardening resin and said urethane resin are each in the form of an aqueous dispersion.

11. The vinyl chloride-coated steel plate according to claim 1, wherein said hardening resin and said urethane resin are each in the form of an aqueous dispersion.

12. The vinyl chloride-coated steel plate according to claim 1, said adhesive contains from 10 to 30% by weight of said urethane resin.

* * * * *